Aug. 8, 1950     M. MAY     2,518,045
ELECTRONIC MEASURING AND DETECTING APPARATUS
Filed Dec. 18, 1946     2 Sheets-Sheet 1
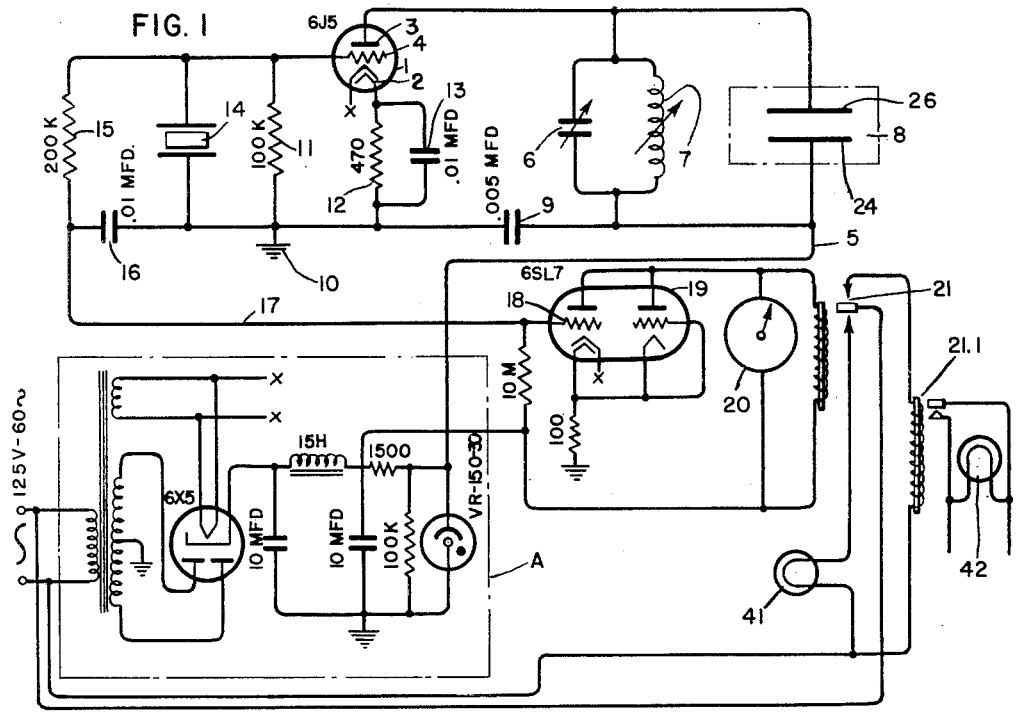
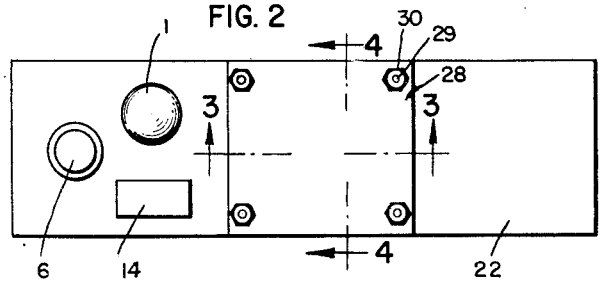
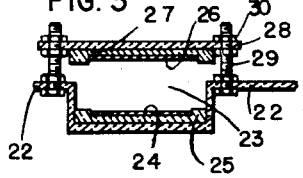
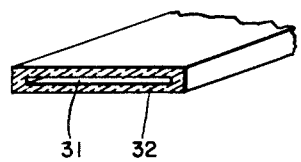
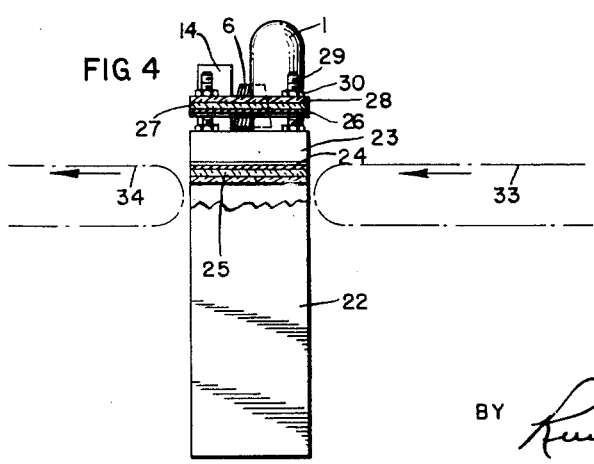
INVENTOR
MADELINE MAY
BY
ATTORNEYS Aug. 8, 1950          M. MAY          2,518,045

ELECTRONIC MEASURING AND DETECTING APPARATUS

Filed Dec. 18, 1946          2 Sheets-Sheet 2

INVENTOR
MADELINE MAY
ATTORNEYS

Patented Aug. 8, 1950

2,518,045

UNITED STATES PATENT OFFICE 2,518,045

ELECTRONIC MEASURING AND DETECTING APPARATUS

Madeline May, Chicago, Ill., assignor, by mesne assignments, to New York Motor Coach Advertising Inc., a corporation of New York Application December 18, 1946, Serial No. 716,979

2 Claims. (Cl. 175—183)

This invention relates to measuring and detecting apparatus, and particularly to such devices utilizing electronic means to detect and measure variations in capacitance between spaced electrodes in an oscillator circuit.

The main objects of this invention are to provide an improved and more sensitive measuring and detecting means for determining variations from a predetermined standard in physical objects; to provide such a means that is operable with both conductive and non-conductive objects; to provide such a means capable of actuating visual indicating devices or mechanical sorting means upon minute variations from a predetermined normal of the dielectric characteristics of material under test; to provide an improved detecting and measuring means whereby minute variations of the dielectric characteristics of material under test produce rapid and relatively wide changes in visual indicating means or electro-mechanical apparatus; and to provide improved and simplified means for detecting and measuring changes in capacitance between spaced stationary electrodes in an oscillator circuit.

A specific embodiment of this invention is shown in the accompanying drawings in which:

Figure 1 is a diagrammatic illustration showing the circuit connections of the electrical components of the improved detecting means.

Fig. 2 is a top plan view of a detector chassis embodying the improved detecting means.

Fig. 3 is a fragmentary sectional view of the detecting electrodes of the device of Fig. 2, as taken on line 3—3 thereof.

Fig. 4 is a sectional elevation as taken on line 4—4 of Fig. 2, indicating, by broken lines, means for mechanically passing articles to be tested between the detecting electrodes.

Fig. 5 is a fragmentary perspective view showing a shielded electrode.

Figure 6:
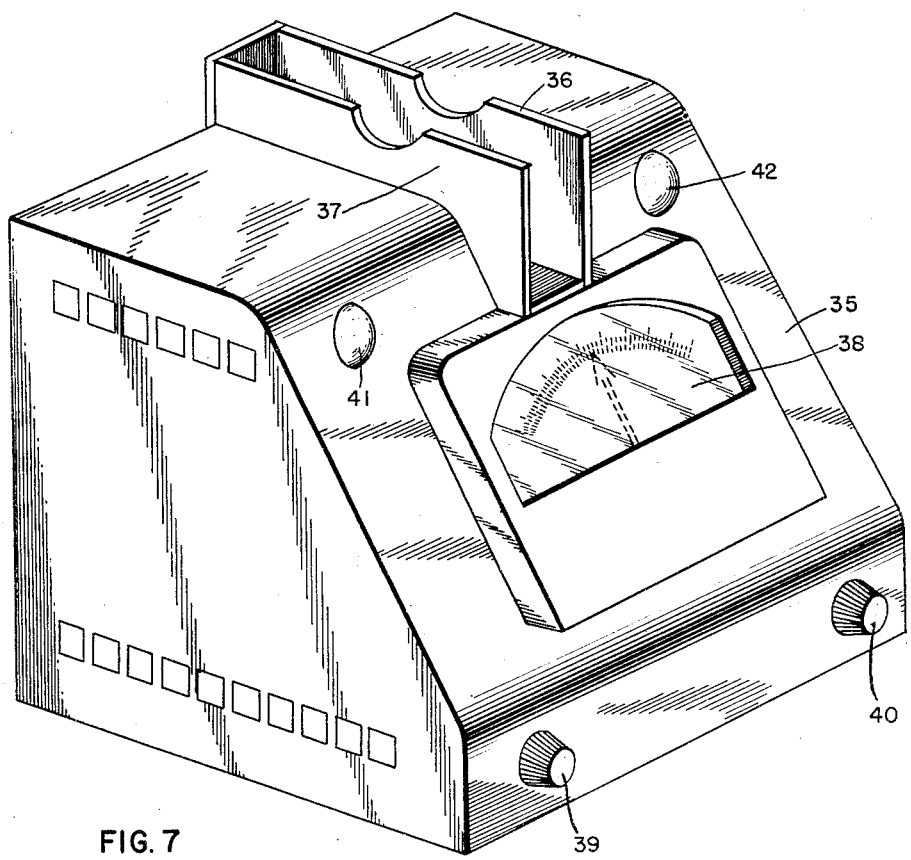
Fig. 6 is a perspective view of a detector chassis arrangement for testing packaged sheet material such as currency.

As shown in the drawings, the improved detecting and measuring means comprises an airgap capacitor coupled, in parallel, with suitable tuning means in the plate circuit of a vacuum tube oscillator arranged to produce current changes in the oscillator grid circuit in accordance with any detuning effect produced by variation of the capacitance of the air-gap capacitor, after the oscillator has been tuned with a predetermined or optimum capacitance in the capacitor; and suitable means to utilize the current changes in the oscillator grid circuit to actuate electro-mechanical apparatus such as a meter or relay.

The particular circuit shown employs an oscillator of the piezoelectric type wherein a suitable crystal in the oscillator grid circuit is used to determine the basic frequency of the oscillator tank circuit, the object being to provide an oscillator in which the amount of feedback is determined by the frequency and power factor of a tuned plate tank circuit in order to obtain the sharpest or steepest frequency response to any variation from a tuned optimum, of the capacity of an air-gap capacitor. However, any suitable oscillator may be used which is stable and sensitive to very small changes in capacity, yet unstable enough through sensitivity to frequency changes to react favorably and cause a large change in feedback upon a small change in the capacitance or power factor of the tank circuit.

As shown, the grid of the oscillator tube is coupled to the grid of a suitable amplifier tube. Thus, when the plate or tank circuit of the oscillator is tuned so that its frequency and power factor are such that, relative to the frequency and power factor of the oscillator grid circuit, proper phase and voltage relations are established to sustain oscillation, the oscillator grid will draw a negative current and thereby furnish bias to the amplifier tube.

Any change in the capacitance of the air-gap capacitor will produce a change in the oscillatory voltage and result in a change in the oscillator grid current, thereby changing the bias on the amplifying tube so as to cause a change in the plate current of the ampliflying tube. This plate current of the amplifying tube may then be used to actuate a suitable indicating means or to operate a relay controlling a separate operating circuit.

Preferably, the amplifying tube is of a type wherein a small change in the grid voltage of the amplifying tube will produce a large change in the amplifier plate current, sufficient to operate a relay or cause a readily readable deflection of a meter indicator.

Thus, the fundamental principle upon which the improved detector and measuring means operates is the measurement of the resultant capacitance or power factor of a capacitor, produced by the dielectric characteristics of an article under test, by the effect that such resultant capacitance produces in detuning the plate tank circuit of the oscillator and thus varying the negative current of the oscillator grid, using such negative grid current change to control the operation of an indicating or amplifying device.

Referring particularly to Figure 1 of the drawings, the detecting means circuit, as shown, includes a vacuum tube oscillator 1, such as a 6J5 tube, having a cathode 2, a plate 3, and a grid 4. The plate derives its energy by way of a lead 5 from a conventional "B" power supply, represented in that portion of the diagram within the dot-dash outline A. The lead 5 is connected to the plate 3 through a variable inductance 7, in parallel with which are a variable capacity 6, and an air-gap capacitor 8. This plate or tank circuit is by-passed to ground by means of a condenser 9.

The grid 4 of the tube 1 is connected to ground at 10 through a 100,000 ohm resistor 11, and the cathode 2 is connected to ground through a 470 ohm resistor 12 and a .01 mfd. by-pass condenser 13. A suitable crystal 14 is connected across the resistor 11 to ground, and a filter circuit comprising a 200,000 ohm resistor 15 and a .01 mfd. condenser 16 are included to afford greater stability. Also, as shown, the grid 4 of the oscillator is connected by a lead 17 to the grid 18 of a suitable amplifier 19.

The plate circuit of the amplifier 19 includes a suitable meter 20 and a sensitive relay 21, arranged in parallel, and the amplifier arrangement is such that the flow of current in the amplifier plate circuit will change rapidly and in inverse order upon any change in bias of the grid 18.

In the oscillator grid circuit the current is negative with respect to the cathode, and thus the amplifier grid is biased negatively by the oscillator grid circuit voltage, and this regulates the flow of current in the amplifier plate circuit. The amount of negative current or voltage in the oscillator grid circuit is determined by the capacity of the capacitor 8, and, once the oscillator circuit has been tuned, any variation of the capacity 8 will find immediate response through change in the negative grid potential, which in turn will affect the flow of current in the amplifier plate circuit. Thus, a decrease of the voltage applied to the grid 18 of the amplifier 19 will cause an increase in the amplifier plate current, or an increase of the grid voltage will cause a decrease of the amplifier plate current, and the change will at once be indicated on the meter 20 and cause actuation of the relay 21.

The values of the inductance 7 and capacitance 6 and the basic capacitance of the capacitor 8 are determined by the frequency at which the oscillator is to operate under standard or normal conditions and the physical and dielectric characteristics of the articles or objects to be tested. The physical characteristics of the articles or objects to be tested also determine the size and spacing of the electrodes or plates comprising the capacitor 8.

Illustrative values for the several resistances and condensers that may be employed in the circuits of a typical detecting means are shown on the diagram of Figure 1, and in such a device the amplifier 17 may be a standard 6SL7 tube, and the meter 20 a sensitive 0-30 volt D. C. device. The variable capacitance 6 may be 0-50 mmfd., the variable inductance 7 may be 15 microhenrys, and in such case the capacitor 8 may comprise copper or brass plates 1⅝" x 3" spaced 7/32" apart. The crystal 14 may be a standard zero temperature coefficient element designed to oscillate at 7 megacycles.

The operation of the device requires a single adjustment of the oscillator plate or tank circuit to obtain an optimum output from the amplifier plate circuit for the desired indicating or actuating operations. This is done by placing a standard article, object, or package, upon which measurement and detecting are to be based, between the electrodes of the capacitor 8, and then tuning the oscillator plate or tank circuit by means of the variable capacitance 6 and inductance 7 so that the amplitude of the oscillator tube grid current is such as to cause the required difference of potential to exist across the meter 20 or the relay 21, or both, for their desired operation.

With respect to the relay 21, it will be understood that the oscillator grid voltage value, and hence the amplifier plate current, will be determined by whether it is desired to actuate the relay upon an increase of the capacitance of the capacitor 8, or upon a decrease of such capacitance. Such amplifier plate current will of course be indicated by the meter 20.

If the device is to be operated merely as an indicating or counting means, the value of the oscillator grid voltage and the resultant amplifier plate current will preferably be such as to cause the meter to indicate a value in the middle range of the meter scale, which indication becomes the base or optimum from which variations are measured. This permits meter scale calibration to determine increases as well as decreases in capacitance between the electrodes of the capacitor 8.

Once the oscillator tank circuit has been tuned to a standard article or object, successive like articles or objects may be placed between the capacitor electrodes, and any variation of the dielectric characteristics or capacitance of such articles from the standard to which the system is tuned, will result in detuning the tank circuit and cause a change in the voltage of the oscillator grid due to change in oscillator frequency and feedback. Such change of oscillator grid voltage produces a change of bias in the amplifier tube, and results in a greater or lesser current flow in the amplifier plate circuit, depending upon whether the capacitance of the article tested is greater or less than that of the standard.

It will be understood that the oscillator must become heated before initial tuning to avoid frequent retuning due to frequency variation caused by temperature change, and that upon the oscillator reaching a normal operating temperature, initial tuning may be done by means of a meter, not shown, in the grid circuit, or by means of the meter 20, the tuning being done to a standard spacing or air-gap between the electrodes of the capacitor 8. Also, if desired, a temperature compensating device, not shown, may be installed across the oscillator plate circuit, which compensating device varies in capacity with temperature and serves to correct for the variations in capacity which occur with changes of temperature.

It should also be understood that in some applications of the improved detecting means, the voltage change in the oscillator grid circuit may be used directly to actuate a meter, thus obviating the need for the amplifier. Such an application would be, for example, counting the number of metal objects in a sealed package. The amplifier is employed where greater sensitivity of meter indications is required, as in the counting of paper sheets in a package, determining whether a predetermined number of sheets is contained in a package, or detecting the presence of foreign or non-standard sheets in a package. Also, if the device is to actuate a reject mechanism, or any other electromechanical means requiring the use of a heavier relay than the relay 21, the relay 21 may be arranged to actuate a second, heavier relay 21.1, as shown in Fig. 1.

The improved measuring and detecting means may be embodied in numerous arrangements of apparatus designed to suitably dispose the spaced electrodes of the capacitor 8 so that the objects to be tested may be successively introduced between the electrodes of the capacitor, either manually or mechanically.

One form of such apparatus is shown in Figures 2 and 4 of the drawings, and comprises a chassis or housing 22 containing most of the electrical components of the detecting and measuring means, and arranged to support the air-gap capacitor electrodes on its upper side. As indicated in Figures 3 and 4, the upper end of the chassis 22 is arranged to provide an open channel 23 extending from side to side of the chassis. The lowermost electrode 24 of the detecting capacitor is disposed at the bottom of the channel 23, and is mounted in a suitable dielectric or insulating block 25 which insulates the electrode 24 from the chassis body. The uppermost electrode 26, also mounted in an insulating block 27, is carried on the underside of a plate 28 adjustably supported on four screw posts 29 by means of nuts 30, whereby the spacing or distance between the plates 24 and 26 may be adjusted or varied. Four supporting posts 29 are employed, since it is essential that the plates 24 and 26 be in parallel planes.

In cases where the article or object to be tested is non-conducting, the electrode plates 24 and 26 may be exposed, since in such case the contact between the article to be tested and the electrodes will not affect the operation of the detecting means. Where, however, the article or object to be tested has exposed conductive parts, it is necessary to wholly insulate the electrodes from the article or object, and this may be done by enclosing the electrode completely within a shell or covering of dielectric material as indicated in Figure 5.

As shown in Figure 5, an enclosed electrode such as the plate 31 will be completely surrounded by the dielectric material 32. It will be understood that the lead for connecting the electrode into the oscillator plate circuit will be attached to the electrode by suitable means, not shown, extending through the dielectric covering. The capacitative effect of this dielectric covering is compensated for by the initial tuning adjustment of the oscillator circuit.

In the form shown in Figure 4, the apparatus is arranged to pass the article or object to be tested between the electrodes 24 and 26 from one side of the apparatus, and to deliver the tested articles from the opposite side. As will be understood by those skilled in the art, the articles to be tested may be automatically positioned between the electrodes by means of a suitable conveyer, indicated by the dot-dash line 33, and the tested articles may be delivered onto a second conveyer indicated by the broken line 34. In such an arrangement, the delivery conveyer 33 will deliver articles successively to the space between the electrodes 24 and 26, and suitable means, not shown, will be provided to control the coupling between the oscillator and the amplifier automatically so that such circuit will be interrupted except for the time that an article to be tested is centered between the electrodes 24 and 26. This will avoid undue vibration of the meter indicator and undesired actuation of the relay 21 during exchange of the test objects.

As shown in Figures 2 and 4, the oscillator tube 1 and the crystal 14 are mounted on the upper end of the chassis, the purpose being to keep the oscillator tube 1 as near the detector plates or electrodes as possible, and to shorten the leads of the oscillator circuit as much as possible.

Figure 7:
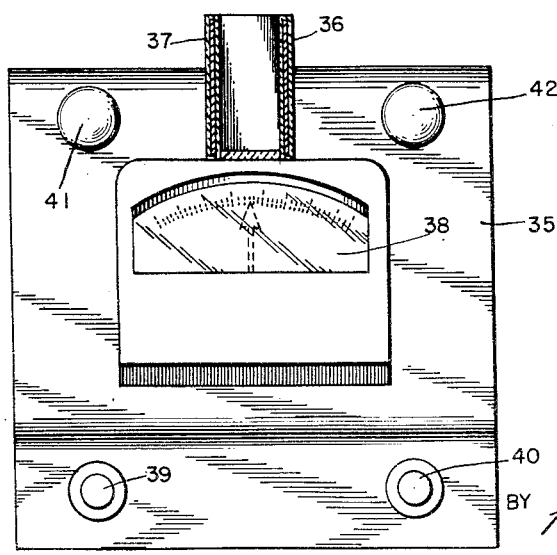
Fig. 7 is a front view of the same showing the detecting electrodes in section.

Another form of apparatus embodying the improved detecting means is shown in Figures 6 and 7 of the drawing. This form of apparatus is designed for manual insertion of the article to be tested between the electrode plates, and is particularly adapted to counting sheets of paper in a package, or the number of bills in a package of currency, the apparatus being provided with a meter by means of which variations from a predetermined standard may be visually determined.

As shown in Figures 6 and 7, the electronic detecting equipment is housed within a chassis 35, and the detecting electrodes are disposed vertically at the top of the chassis 35, and arranged as the side walls of a slot or pocket in which the article to be tested is inserted. In this case, the detecting electrodes 36 and 37 are preferably entirely enclosed within a protective covering of a suitable dielectric material so that there will be no danger of an electrically conductive material coming into contact with the electrode plates. As shown, the meter 38 is disposed on the front face of the chassis 35 so as to be readily readable; and the tuning knobs 39 and 40 for adjusting the variable capacitor 6 and the variable inductor 7, respectively, are also brought to the front side of the chassis 35 for convenience in tuning the oscillator circuit. In this device, red and green lights 41 and 42, respectively, are also provided, which lights are controlled through the oscillator grid circuit to indicate green when the oscillator is in tune, and red whenever the oscillator is detuned.

The meter 38, in this form of apparatus, may be calibrated to suit the particular operations which are expected to be performed by the apparatus. For example, for checking packages of currency, the meter may be calibrated to indicate the actual count of the number of bills contained in the package.

The main advantages of this invention reside in the simplicity of the circuit and the electrical components thereof for detecting and determining small variations, from a predetermined standard, of the capacity or dielectric character of the article or object being tested. Other advantages reside in the application of the negative voltage in the oscillator grid circuit for controlling the operation of a meter or a relay, or both, in response to changes of frequency in an oscillatory circuit occasioned by detuning of the oscillatory circuit due to change of capacitance, thereby providing extreme sensitivity in the detecting or measuring operation. Further advantages reside in the suitability of the device for use in counting, or determining the correctness of count, of objects contained in a closed or sealed package, such as packaged coins or tokens where the objects are not visible.

Still further advantages are to be found in the fact that the improved detecting and measuring means is more simple in construction, and more easily operated than the beat frequency oscillators and frequency modulation detector circuits heretofore used for similar purposes, and permits the use of cheap, rugged, long life tubes that are ordinarily not suitable for sensitive measuring apparatus.

Although but one specific embodiment of this invention is hereby shown and described, it will be understood that details of construction and arrangement of the circuits and devices shown may be altered or omitted without departing from the spirit of this invention as defined by the following claims.

I claim:

1. A testing means of the class described comprising a piezoelectric oscillator having an air-gap capacitor in its tank circuit adapted to receive an article to be tested, means in said tank circuit to tune said oscillator with the capacity of a predetermined standard, an amplifier tube having a control grid, means coupling the crystal circuit of said oscillator with the control grid of the amplifier to variably bias said amplifier by means of the voltage changes in said crystal circuit, and means controlled by the output of said amplifier to determine the effect upon the crystal circuit voltage due to variation of capacitance between said standard and the article being tested.

2. A testing means of the class described comprising a vacuum tube oscillator having an air-gap capacitor in its tank circuit and piezoelectric means in its grid circuit, said capacitor having a pair of spaced electrode plates arranged to receive an article to be tested, means in said tank circuit to tune said oscillator with a predetermined standard capacitance in said capacitor, and means responsive to voltage change in the grid circuit of the oscillator tube arranged to indicate a change of capacity of said capacitor.

MADELINE MAY.

REFERENCES CITED

The following references are of record in the file of this patent:

UNITED STATES PATENTS

| Number | Name | Date |
|---|---|---|
| 1,608,048 | Taylor | Nov. 23, 1926 |
| 1,975,812 | Wallace | Oct. 9, 1934 |
| 2,263,755 | Bock | Nov. 25, 1941 |
| 2,266,114 | Bartlett | Dec. 16, 1941 |
| 2,297,346 | Crist | Sept. 29, 1942 |
| 2,326,427 | Bickel | Aug. 10, 1943 |
| 2,375,084 | Coroniti et al. | May 1, 1945 |
| 2,399,859 | Crawley | May 7, 1946 |